Patented Jan. 14, 1941

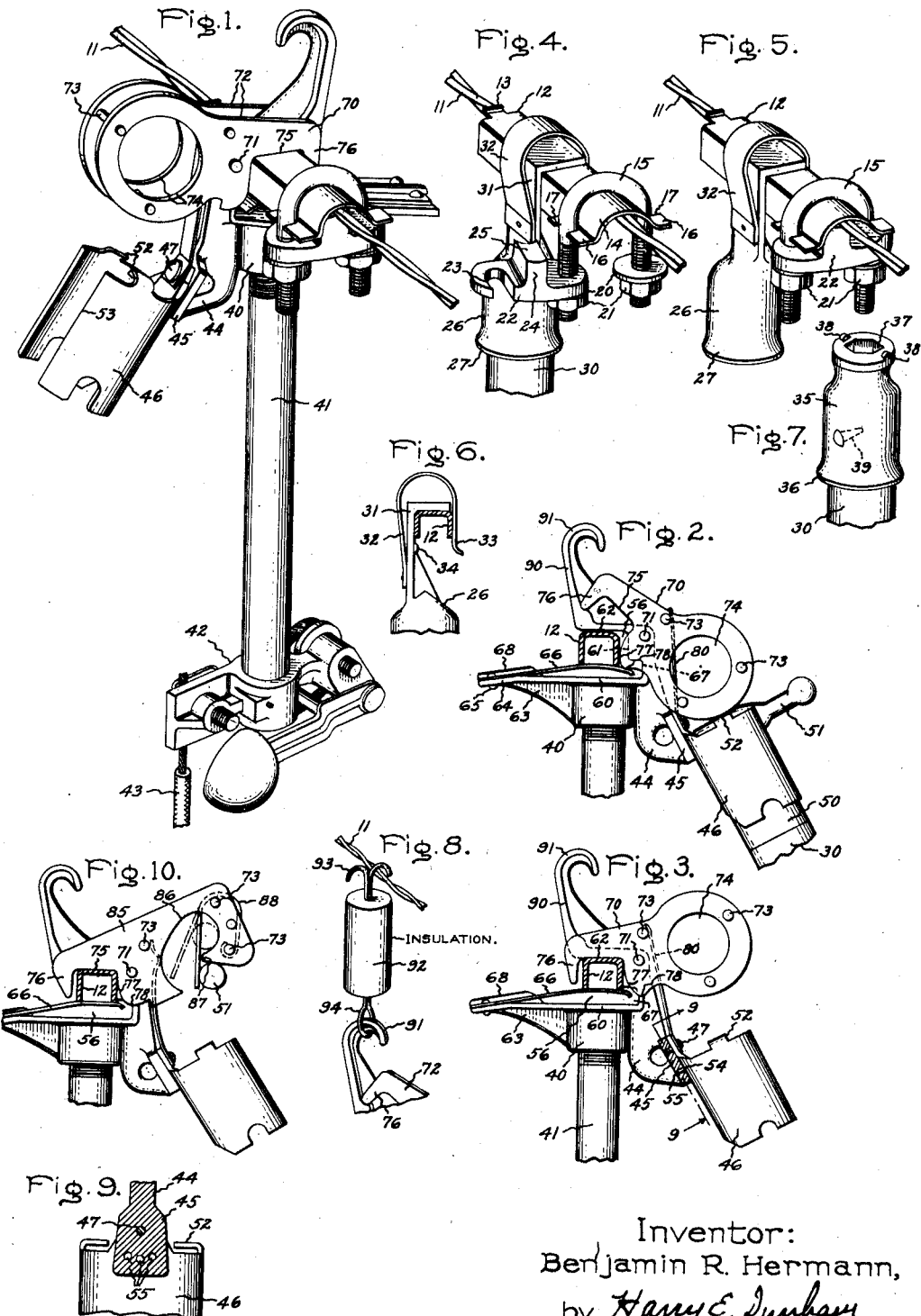

2,228,824

UNITED STATES PATENT OFFICE 2,228,824

ELECTRIC LINE TAPPING APPARATUS

Benjamin R. Hermann, Lanesborough, Mass., assignor to General Electric Company, a corporation of New York Application January 3, 1938, Serial No. 183,046

20 Claims. (Cl. 173—273)

The present invention relates to apparatus, commonly referred to as line tapping apparatus, for the making of more or less temporary electric connection to overhead line conductors of power or distribution systems.

A general object of the invention is the provision of improvements in line tapping apparatus suitable for installation of electric cutouts, lightning arresters, and the like, on overhead line conductors, or for making grounding or other tap-off connections to such conductors.

One of the more specific objects of the invention is the provision of improved line tapping apparatus including means for preventing wearing, corrosion, and arc-burning of a line conductor while insuring good electrical and mechanical connection to the line conductor.

Another of the more specific objects of the invention is the provision of an improved line tapping device which may be installed on or removed from a line conductor with one simple and rapid motion to facilitate the ease of line maintenance by a service man and to insure rapid breaking of an arc which might be drawn upon removal of the device from a line conductor under load or short-circuit conditions.

Other objects and the details of that which I believe to be novel and my invention will become apparent from the following description and the claims appended thereto taken in conjunction with the accompanying drawing in which an exemplary embodiment of the invention is illustrated as employed in the installation of a line suspension fuse cutout, although it is to be understood that the invention may be employed to equal advantage in the making of tap-off connections for other purposes.

In the drawing Fig. 1 shows in perspective the manner of employing my improved line tapping apparatus for the line suspension of a fuse cutout; Figs. 2 and 3 illustrate details of the manner of installation of the apparatus; Figs. 4 and 5 illustrate in perspective details of the installation of certain parts of the apparatus; Fig. 6 shows in part a side view of an improved installation tool or fitting; Fig. 7 shows in perspective another improved installation tool or fitting; Fig. 8 illustrates the form and manner of mounting of a temporary suspension supporting device forming part of my invention; Fig. 9 illustrates a detail, partially in section along the line 9—9 of Fig. 3, of a part of the line tapping device; and Fig. 10 illustrates a modification of another part of the line tapping device.

Referring to the drawing, 11 designates a line conductor upon which is mounted a saddle 12 which is adapted for permanent installation to serve as a line guard and to receive the clamping means of a line tapping device, as will be described more in detail hereinafter. This saddle is constructed of stainless steel or other suitable wear and corrosion resisting material capable of providing a conductive path to the line conductor. The saddle is of rectangular U-shaped cross-section throughout the major portion of its length and has at one end thereof an upturned projection 13 adapted to serve as a stop. At the other end, the saddle is formed with a semi-cylindrical portion 14 for receiving a U-shaped clamping bolt 15. This semi-cylindrical portion has outturned flanges 16 provided with notches 17 for retaining and positioning the U-bolt. The legs of the U-bolt are threaded for the reception of clamping washers 20 and nuts 21. Any suitable means, such as deformation of the threads at the ends of the legs, may be employed if desired for preventing inadvertent screwing of the nuts off of the U-bolt. A clamping bar 22 is mounted at one end on one of the legs of the U-bolt for swinging thereabout and is prevented from dropping off of its supporting leg of the bolt by a corresponding washer 20 and nut 21. The other end of the bar is provided with a slot 23 adapted to be swung into engagement with the other leg of the U-bolt. A transverse ridge 24 is formed on the upper side of bar 22 and is provided with a longitudinally extending grooved seat 25 for engagement with the line conductor. The saddle is adapted to be installed upon the line conductor with the open side of the saddle facing downwardly, as illustrated, and the shape of the saddle adapts it for installation on different size line conductors while providing a uniform sized part for connection of the line tapping device thereto.

I have provided two improved fittings or tools for installation of saddle 12 on the line conductor. One of these tools comprises a spring clip holder 26 having a body portion in the form of a bell-shaped socket 27 for tight engagement with the end of an insulating switch stick or line maintenance pole, a portion of which is shown at 30. Projecting upwardly from the body portion 27 of the holder is an inverted L-shaped portion 31 to the back of which is secured, by riveting or other suitable means, a spring strip 32 which curves up over the top of the L-shaped portion and then downwardly in front of the L-shaped portion to provide a seat approximately conforming in shape to the shape of saddle 12, as best shown in Fig. 6. Spring strip 32 is formed adjacent its free end with an inwardly convex detent portion 33 arranged to cooperate with a ridge 34, formed in the L-shaped portion, to hold saddle 12 in the seat provided by the spring and the L-shaped portion. With the saddle supported by tool 26 in the manner shown, it may be raised by stick or pole 30 and placed on the line conductor. Any suitable means may be provided for fixedly securing tool 26 on a maintenance pole, or the tight frictional engagement between socket 27 and the pole may be relied upon for maintaining the tool on the pole during installation of the saddle. In this latter case the pole may be removed from the socket after the saddle is on the line, and then the spring strip 32, along with the shape of the holder and the weight of the lower end of the holder, will prevent the holder and saddle from dropping off of the line conductor, as shown in Fig. 5.

A second fitting or tool 35 is provided for clamping the saddle 12 in place on the line conductor. This second tool also has a lower body portion in the form of a bell-shaped socket 36 for tightly engaging the upper end of an insulating switch stick or pole 30. Suitable means, such as a pin 39, may be provided for positively preventing turning of tool 35 on the pole. If the pole initially employed for supporting tool 26 and saddle 12 is removed from socket 27 after placing of the saddle and tool 26 on the line conductor, this same pole may be employed for supporting tool 35. However, in some cases, it may be desirable to leave one pole 30 in the socket 27 of tool 26 and to employ another pole 30 for supporting tool 35. The upper end of tool 35 is in the form of a socket wrench having an opening 37 of proper shape for accommodation of nuts 21. In order to clamp the saddle on the line conductor, and with bar 22 in its open position illustrated in Fig. 4, tool 35 is pushed up over the left-hand leg of U-bolt 15 until the corresponding nut 21 is engaged by opening 37. By pushing tool 35 sufficiently far up, rounded bosses 38 on the upper surface of the tool are caused to engage opposite sides of bar 22, so that by turning pole 30 to the right, the bar may be swung about the left-hand leg of the U-bolt until slot 23 engages the right-hand leg of the U-bolt. Then the pole is rotated further to the right to tighten the left-hand nut 21 on the left-hand leg of the U-bolt. The rounded bosses 38 ride under the bar during this tightening operation. After the left-hand nut is tightened up, the socket wrench portion of tool 35 may be engaged with the nut 21 on the right-hand leg of the U-bolt to tighten this latter nut. When the two nuts are drawn up tightly, saddle 12 is firmly fixed on the line conductor and extended electrical contact is made due to the length of the saddle and the length of grooved seat 25 in bar 22. After the saddle is firmly fixed in place, tool 26 may readily be removed by simply pushing upwardly thereon by means of a pole 30 engaged in its bell-shaped socket 27.

When installed on a line conductor, saddle 12 prevents wearing of the line conductor due to installation and removal of a line tapping device and prevents arc-burning of the line conductor if connection is made thereto under load or short-circuit conditions. The saddle serves further to provide a definite location for a tapping device relative to other line equipment and insures good mechanical and electrical connection of a tapping device to the line conductor. Moreover, the shape of the saddle and its stop projection 13 and outwardly projecting flanges 16 prevent turning and displacement of the line tapping device, both during installation and while the device is supported on the line conductor.

The line tapping device of my present invention incorporates an improved terminal and quickly detachable clamping assembly. The main supporting element of the assembly has a body portion 40 which in the illustrated exemplary embodiment is formed with a socket for receiving the screw-threaded upper end of a fuse holder 41 which has at its lower end a combined terminal and indicating device inclusively designated 42. This latter device does not form part of the present invention, but is of the type disclosed in my application Serial No. 85,062, filed June 13, 1936, issued as Patent 2,128,145 on Aug. 23, 1938, and assigned to the assignee of the present invention, and to which device may be clamped a connection lead 43 as illustrated. As will be evident to one skilled in the art, the body portion of my improved line tapping device may if desired be adapted for the connection thereto of an electric device other than a fuse, such as for example a lightning arrester, or for connection thereto of a grounding or tap-off conductor.

Extending outwardly and downwardly from the back of body portion 40 is an arm 44 having a connection plate 45 extending transversely of the arm and obliquely outwardly relative to the vertical axis of body portion 40, as best shown in Figs. 2 and 3. The upper end of a switch stick socket element 46 is swivelly attached to plate 45 by means of a screw 47. This socket element is of generally cylindrical shape and is adapted to receive therein a switch stick head 50 of common form mounted on the end of an insulating switch stick or maintenance pole 30 and having a right-angle hook projection 51. At the upper end of the socket element are inwardly projecting stops 52 arranged to engage the upper end of the switch stick head to limit upward sliding thereof in the socket element, and a longitudinal slot 53 is provided in the outer side of the socket element so that hook projection 51 may travel therein as the switch stick head is inserted in the socket element. The back of the socket element is provided with a pin 54 adapted to be received in one of the three openings 55, shown best in Fig. 9, in connection plate 44. These openings 55 provide for selective positioning of socket element 46 relative to body portion 40 and to a fuse holder or other device connected to this body portion. For example, if screw 47 is tightened up with pin 54 in the middle one of the openings 55, the socket element will be maintained in such position that its longitudinal axis lies substantially in the same plane with the longitudinal axis of body portion 40 and fuse holder 41. By loosening screw 47, socket element 46 may be moved to the right or left to engage pin 54 with one or the other of the side openings 55 and then with screw 47 tightened up, the socket element is maintained in a position such that its longitudinal axis extends at an angle either to the right or the left of a plane through the longitudinal axis of body portion 40 and fuse holder 41. Thus provision is made for selective positioning of the socket element relative to the main supporting element of the line tapping device. As a result of this expedient, the socket element may be positioned by linemen so as to make it most convenient for manipulation of the line tapping device in accordance with different conditions encountered in installation or servicing. Also, due to the fact that connection plate 45 slants outwardly obliquely relative to the axis of body portion 40, a fuse holder of the expulsion type such as the one illustrated will be supported so that its lower end extends outwardly at an appreciable angle away from a switch stick which is engaged with socket element 46 in the manner illustrated in Fig. 2. Thus, the lower expulsion end of the fuse holder will be directed away from a lineman holding the switch stick so as to prevent injury to the lineman due to the discharge of gases from the fuse holder in case it is installed on a line conductor under overload or short-circuit conditions.

The main supporting element of the line tapping device is formed with a generally rectangular recess 56 adapted to receive conductor 11 and saddle 12. This recess is defined by a bottom wall 60 arranged to extend substantially horizontally or at right angles to the axis of body portion 40, a rear wall 61 and a top wall 62, the front of the recess being open to allow passage of saddle 12 into the recess. Projecting outwardly from the front of body portion 40 is an arm 63 the top of which forms a smooth flat extension of the bottom wall 60 of the recess. The outer portion of this extension of bottom wall 60 slants slightly downwardly and outwardly relative to the main portion of the bottom wall, as indicated at 64, and has secured thereto by rivets 65 or other suitable means the outer end of a contactor spring strip 66. This spring strip has a slight upward bow or convexity and extends into main recess 56 with the inner end of the spring strip vertically movable in a smaller recess 67 formed in the lower portion of the rear wall of recess 56. The outer end of the spring strip has a longitudinal slot through which projects upwardly a guide ridge 68 formed on the upper outer surface of arm 63. Spring strip 66 has, among others, the important functions of frictionally holding saddle 12 in recess 56 and of pressing upwardly on the saddle to maintain the top of the saddle firmly in electrically conductive contact with the top wall 62 of the recess, as shown in Fig. 3.

Under some conditions, such as wind or line vibration, the frictional engagement of saddle 12 with spring strip 66 and upper wall 62 of recess 56, produced by upward pressure of the yieldable spring strip, would be insufficient to prevent the line tapping device from becoming dislodged from the saddle and line conductor. Therefore, to insure positive retention of the saddle in recess 56, I have provided a latching element 70 which is fulcrumed on a pivot pin 71 carried by the main supporting element of the line tapping device adjacent the upper rear corner of recess 56. As best shown in the perspective view of Fig. 1, latching element 70 is comprised of two plate members 72 secured rigidly in spaced apart relation by spacing mmebers 73, and plate members 72 are disposed respectively on opposite sides of the supporting element of the tapping device. Members 72 are formed with alined eyelet openings 74 disposed to the rear of pivot 71 and arranged for manipulating engagement by the hook portion 51 of the common form of switch stick shown in part in Fig. 2 of the drawing. On the other side of pivot 71 from openings 74, members 72 have alined recesses 75 of approximately rectangular shape, to conform to the shape of saddle 12, and arranged to receive and engage the saddle. The portions of members 72 which define the outer walls of recesses 75 comprise downwardly projecting, rounded-ended latching fingers 76 arranged to project over the open side of recess 56 when the latching element is in its closed position illustrated in Figs. 1 and 3, thereby positively to hold the saddle in recess 56. The rear walls of recesses 75 in members 72 are in the form of cam surfaces 77 which curve downwardly and backwardly to cam or detent portions 78. Cam surfaces 77 are arranged so that they project forward of the rear wall 61 of recess 56 when latching element 70 is in its open position illustrated in Fig. 2, thereby to serve as trip means for engagement by saddle 12 for a purpose to be described hereinafter. A leaf spring 80, the lower end of which is anchored to arm 45 by means of screw 47, is arranged so that its free end presses against one of the spacing members 73 to exert a force tending to rotate latching element 70 forward, or in a counterclockwise direction, as viewed in Fig. 2.

A modified form of latching element, inclusively designated 85, is illustrated in Fig. 10. This latter latching element also is comprised of two spaced apart plate members fulcrumed on pivot pin 71 and having recesses 75 for engagement with saddle 12 and latching fingers 76 for maintaining the saddle in recess 56 of the main supporting element of the line tapping device. The plate members of latching element 85 are secured in spaced apart relationship by means of spacing member 73. The element 85 also has cam surfaces 77 and detent portions 78 to the rear of recess 75. However, the latching element 85 differs from latching element 70 in the means provided for receiving the hook projection 51 of the common form of switch stick illustrated. The plate members comprising element 85 have formed therein, to the rear of pivot 71, upwardly and backwardly curving slots 86 the rear bottom walls of which are formed by inwardly extending latching projections 87. Disposed between the plate members of element 85 and supported by certain of the spacing members 73 is a spring strip 88 which is bent around and tensioned so that its free end tends to flex toward the rear of slots 86 and latching projections 87. With this arrangement the free end of spring strip 88 may be engaged by the hook projection of a switch stick so that with a simple upward movement of the switch stick, the free end of the spring strip is forced away from projections 87 so that switch hook projection 51 may be snapped into place in the socket formed by the curved rear portions of slots 86. Under these circumstances, hook projection 51 is maintained resiliently latched in the curved rear portions of slots 86 by means of the spring strip, as shown by the broken lines of Fig. 10. This expedient prevents the line tapping device from dropping off of the switch stick when it is unlatched and pulled free from the line conductor and saddle in the manner to be described hereinafter.

With an understanding of the form and arrangement of the various elements of my improved line tapping device, the manner of installing the device on a line conductor and of removing it from the conductor may now be described. For installation of the device, latching element 70, or 85, as the case may be, is rotated to its open position illustrated in Fig. 2. Detent portions 78 then engage the inner end of spring strip 66 to deflect the spring strip downwardly toward the bottom wall 60 of recess 56 to a retracted position, thereby providing for the ready reception of saddle 12 in the recess, the latching fingers 76 being raised out of closing relation to the front of the recess. Switch stick head 50 then is inserted in socket element 46, with hook projection 51 in slot 53, until the upper end of the head engages stop projections 52. The previously described angular relationship between the axis of switch stick 30 and the axis of body portion 40 is particularly advantageous in the installation of an expulsion fuse holder of the type illustrated, since, as the line tapping device is raised into contact with the line conductor, or saddle, the expulsion end of the fuse holder with the connection lead 43 connected thereto, is pointed away from the lineman so that he will not be injured by gas discharge incident to completion of the connection under possible overload or short-circuit conditions. Also, the provision for selective positioning of socket element 46 obliquely, to one side or the other, of a vertical plane through the body of the line tapping device, provides for installation of the device from a position either on the ground or on a pole supporting the line conductor. When the line tapping device is raised by stick or pole 30, the ridge 68 on the outer end of arm 63 is brought into engagement with the underneath side of saddle 12 and with practically the same movement of the switch stick the tapping device is forced onto the saddle so that the rear side of the saddle engages cam surfaces 77 adjacent the rear of recess 56. This engagement forces the cam surfaces backwardly, with resultant forward rotation of the latching element 70, or the latching element 85, until the detent portions 78 of cam surfaces 77 become disengaged from the end of spring strip 66. Then the slightly downwardly curved end of the spring strip exerts on portions of cam surfaces 77 a force having a vector to the right of pivot 71, thereby producing further forward movement of the latching element to closed position illustrated in Figs. 1 and 3, and Fig. 10. This final movement of the latching element to closed position is a snap action movement due to the resiliency of the spring strip and the sliding of the rounded end of the spring strip over cam surfaces 77. The snap action movement is aided by the forward pressure of spring strip 80. As the end of spring strip 66 becomes disengaged from cam surfaces 77, this latter spring strip quickly flexes upwardly to its position shown in Fig. 3 and Fig. 10, to effect firm electrically conductive engagement of the top of saddle 12 with the top wall 62 of recess 56. Thus saddle 12 is frictionally held in recess 56 by spring strip 66 and is positively retained in the recess by latching fingers 76. The latching element is maintained in closed position by spring strip 80. Also, the end of spring strip 66, when raised, is in position to be engaged frictionally by cam surfaces 77 in such manner as to prevent accidental rotation of the latching element to open position. Thus, the line tapping device is latched firmly against being dislodged sideways from the saddle and from twisting movement on the saddle, while stop 13 and flange projections 16 at the opposite ends of the saddle prevent the device from being slid endways off of the saddle.

From the description of the preceding paragraph, it will be seen that installation of the line tapping device may be effected with a single upward and forward movement of a switch stick 30. Removal of the device from the line conductor also may be effected by a single rapid movement of the switch stick in the opposite direction, so as to insure quick extinction of any arc which may be drawn upon removal of the device from the line. To this end the hook projection 51 of the switch stick is engaged with eyelets 74 of the embodiment of Figs. 1 to 3, or with the socket slots 86 of the embodiment of Fig. 10 in the manner previously described, and a single backward and downward pull on the switch stick serves to remove the line tapping device from saddle 12. More in detail, the downward and backward pull on the latching element 70, or the latching element 85, produces rotation of the latching element in a clockwise direction, as viewed in Figs. 3 and 10, about pivot 71, the force exerted on the latching element being sufficient to cause cam surfaces 77 to ride over the end of spring strip 66. Thus latching fingers 76 are moved upwardly from closing position relative to the front of recess 56 while spring strip 66 is deflected downwardly by cam surfaces 77 and detent portions 78 so as to release saddle 12 for movement out of the recess. The latching element will be maintained in open position by spring strip 66 as previously pointed out.

It sometimes is found desirable temporarily to hang the line tapping device on some support while the lineman performs some other operation on the line. I have provided a simple and safe means for accomplishing this. The main supporting element of the line tapping device is formed with an upwardly projecting arm 90 which has a hook 91 on the upper end thereof which may be engaged with a nail or some other form of support on a line pole to temporarily suspend the line tapping device. For those conditions wherein it is inconvenient to suspend the device on a pole or the like, I have provided a simple, easily carried, insulating support for hanging the device directly on a line conductor. This support comprises, as will be seen from Fig. 8, an insulator 92 which has at its upper end hook elements 93 for engagement with a line conductor 11 and which has at its lower end an eyelet element 94 for engagement by hook 91 of the line tapping device. Thus the line tapping device may be temporarily suspended from the line conductor with safety to the lineman and without danger of short circuit while a tap-off lead is connected to the device. For example, the fuse device of the example illustrated may be suspended from the same line conductor to which it is to be connected or from a different line conductor without the necessity of disconnecting connecting lead 43 from the lower end thereof. This is particularly advantageous in those cases wherein several fuse devices are connected respectively to several adjacent line conductors and the lineman desires temporarily to suspend one of the fuse devices after disconnection thereof from its line conductor, while he removes another one of the fuse devices from its line conductor.

From the foregoing description, it will be seen that I have provided improved appaartus for safely and conveniently making various forms of line tapping connections. It will be evident also that the invention is not limited to the particular details of the exemplary embodiment illustrated and it is my intention therefore that such modifications as do not depart from the true spirit and scope of the present invention shall be covered by the appended claims.

What I claim as new and desire to secure by Letters Patent of the United States is:

1. In a line tapping device, electric conductor receiving means including a conductor engaging surface, yieldable means operative to force a conductor into firm electrically conductive contact with said surface and cooperative with said surface frictionally to restrain the conductor in said receiving means, and releasable latching means distinct and separate from said yieldable means and operative mechanically and positively to retain the conductor in said receiving means.

2. In a line tapping device, electric conductor receiving means including a conductor engaging surface, means yieldably biased to force a conductor into firm electrically conductive contact with said surface and cooperative with said surface frictionally to restrain the conductor against displacement relative to said receiving means, releasable latching means distinct and separate from said yieldable means and including an element movable to a closed position and operative when in closed position mechanically and positively to retain the conductor in said receiving means, and means for releasably restraining said element in closed position.

3. In a line tapping device, conductor receiving means including a pair of elements supported in opposed relationship for receiving a conductor therebetween, at least one of said elements being yieldably biased toward the other of the elments for clamping a conductor between the two elements, means for guiding a conductor into said receiving means between said elements, a latching element movable relative to said pair of elements from an open to a closed position for positively retaining a conductor in said receiving means between said pair of elements, trip means arranged for engagement by a conductor entering said receiving means, and means operative to effect movement of said latching element to closed position upon forcible engagement of said trip means by a conductor entering the receiving means.

4. In a line tapping device, conductor receiving means including a pair of elements arranged to receive a conductor therebetween, at least one of said elements being yieldably biased toward the other of the elements for clamping a conductor between the two elements, a latching element movable relative to said pair of elements from an open to a closed position for positively retaining a conductor in said receiving means between said pair of elements, means for restraining said latching element in open position, trip means arranged for engagement by a conductor entering said receiving means, and resilient means operative to effect snap action movement of said latching element to closed position upon forcible engagement of said trip means by a conductor entering said receiving means.

5. In a line tapping device, means providing a walled conductor receiving recess having an open side for entry of a conductor thereinto, an element disposed in opposing relation to a wall of said recess for frictional engagement with a conductor disposed between said element and said wall, said element being yieldably biased to force the conductor into firm engagement with said wall, and a latching element mechanically separate and distinct from said first mentioned element and operable into a position for blocking said open side of the recess in a manner positively to retain a conductor in said recess against movement from between said first mentioned element and said wall.

6. In a line tapping device, electric conductor receiving means including a contact surface, a spring strip fixedly mounted adjacent one end and having a portion extending in opposed relation to said surface, said strip being tensioned for flexure of said portion toward said surface to frictionally engage a conductor in said receiving means and force the conductor into firm engagement with said surface, and releasable latching means separate and distinct from said spring strip and operative positively to retain a conductor in said receiving means between said surface and said spring strip.

7. In a line tapping device, electric conductor receiving means including a contact surface, a spring strip fixedly mounted adjacent one end and having a portion extending in opposed relation to said surface, said strip being biased for flexure of said portion toward said surface to force a conductor into firm engagement with said surface and said portion being arranged for cooperation with said surface frictionally to hold a conductor against displacement in said receiving means, detent means engageable with said spring strip for holding the strip in a retracted position for ready entry of a conductor into said receiving means between said surface and said portion of the strip, and trip means arranged for engagement by a conductor entering said receiving means and operative to cause said detent means to release said spring strip for flexure toward said surface upon forceful engagement of said trip means by a conductor entering said receiving means.

8. In a line tapping device, electric conductor receiving means including a contact surface, yieldable means biased for forcing a conductor into firm electrically conductive contact with said surface and arranged to cooperate with said surface for frictionally holding a conductor in said receiving means, detent means operative to hold said yieldable means in a retracted position so as to provide for ready entry of a conductor into said receiving means, trip means arranged for engagement by a conductor entering said receiving means and operative to cause said detent means to release said yieldable means upon forceful engagement of the trip means by a conductor entering the receiving means, and releasable latching means operative mechanically and positively to retain a conductor in said receiving means independently of said yieldable means.

9. In a line tapping device, conductor receiving means including a contact surface, an element yieldably biased for engagement with a conductor in said receiving means to force the conductor into firm engagement with said surface, a latching element movable relative to said yieldably biased element from an open to a closed position and operative when in closed position positively to retain a conductor in said receiving means, and means operative to effect movement of said yieldably biased element to a retracted position upon movement of said latching element to open position so as to permit ready movement of a conductor into or out of said receiving means.

10. In a line tapping device, conductor receiving means including a contact surface, an element yieldably biased for engagement with a conductor in said receiving means to force the conductor into firm engagement with said surface, and a latching element movable from an open to a closed position and operative when in closed position to retain a conductor in said receiving means, said latching element having means releasably engageable by said yieldably biased element for restraining the latching element in open position.

11. In a line tapping device, conductor receiving means including a contact surface, an element yieldably biased for engagement with a conductor in said receiving means to force the conductor into firm engagement with said surface, a latching element movable from an open to a closed position for retaining a conductor in said receiving means, said latching element when in open position having means engaging said yieldably biased element to hold the latter element in a retracted position so as to provide for ready movement of a conductor into or out of said receiving means, trip means arranged to be engaged by a conductor entering said receiving means, and means operative upon forcible engagement of said trip means by such entering conductor for effecting movement of said latching element to closed position with accompanying release of said yieldably biased element to force the conductor into engagement with said surface.

12. In a line tapping device, conductor receiving means including a contact surface, an element yieldably biased for engagement with a conductor in said receiving means to force the conductor into firm engagement with said surface, a latching element operable from an open to a closed position for retaining a conductor in said receiving means, said elements having means cooperative when said latching element is in open position for maintaining the latching element in open position and said yieldably biased element in a retracted position, and means arranged for forcible engagement by a conductor entering said receiving means for initiating movement of said latching element toward closed position, said two elements having cam means cooperative upon initiation of movement of said latching element toward closed position for effecting snap action movement of the latching element to closed position and said yieldably biased element being released upon movement of the latching element to closed position for forcing a conductor into firm engagement with said surface.

13. In a line tapping device, a body portion having a generally horizontally extending recess with an open side toward the front of the body portion for entry of a conductor thereinto and having means for engaging and guiding a conductor into the recess including a projection extending forwardly from the lower side of the recess, a latching element, means for operating the latching element to closed position to retain a conductor in the recess, means positioned for relatively forcible engagement by a conductor entering said recess to effect operation of said operating means, and socket means arranged for relatively firm engagement by a maintenance pole in such manner that the pole extends downwardly and rearwardly from said body portion, whereby said device when supported on a maintenance pole engaged with said socket means is engageable with an overhead line conductor or like support by a generally upward and forward movement of the device.

14. In a line tapping device, conductor receiving means arranged for engagement with a supporting conductor, a latching element operative in open position to permit entry of a conductor into said receiving means and operative in closed position to retain a conductor in the receiving means, and a handle carried by said latching element having means engageable by a switch stick for manual operation of the latching element and support of said device after removal thereof from a supporting conductor, said latching element being arranged so as to be movable to open position by a force on said handle having a component in the same direction as that in which said device is movable for disengagement from a supporting conductor, whereby movement of the latching element to open position and disengagement of said device from a supporting conductor can be effected by a single substantially unidirectional movement of a switch stick engaged with said handle.

15. In a line tapping device, conductor receiving means engageable with a supporting conductor, a latching element operative when in closed position to retain a conductor in said receiving means, means for releasably restraining said element in open position, means forcibly engageable by a conductor entering said receiving means for effecting release of said restraining means, and means operative on release of said restraining means for effecting movement of said element to its said closed position and for releasably restraining said element in its said closed position, said latching element having means associated therewith engageable by a switch stick for manual movement of the latching element to open position and for support of the line tapping device by the switch stick upon removal of the line tapping device from a supporting conductor.

16. In a line tapping device having means for detachable clamping connection with an overhead line conductor or like support and adapted to be raised to and lowered from connected position by an insulating line maintenance pole of the type having a hook projection, means for engagement with an overhead line conductor or like support, means providing a socket distinct from said last mentioned means and adapted for receiving a hook projection of a maintenance pole and having an opening for slidable movement of the hook projection into the socket, and yieldably biased means arranged to engage a hook projection in said socket to retain the hook projection in the socket and prevent said line tapping device from dropping off of the supporting maintenance pole of which the hook projection forms a part.

17. In a line tapping device having means for detachable connection with an overhead line conductor or like support and adapted to be raised to and lowered from connected position by an insulating line maintenance pole of the type having a hook projection, means providing a socket for receiving a hook projection of a maintenance pole and having an opening for slidable movement of the hook projection into said socket, and means for retaining such a hook projection in said socket including a fixed spring strip yieldably biased to engage the hook projection, said spring strip having a portion arranged for engagement by a hook projection entering said opening to deflect the spring strip to a retracted position and permit entry of the hook projection into said socket.

18. In a line tapping device having means for detachable clamping connection with an overhead line conductor or like support and adapted to be raised to and lowered from connected position by an insulating line maintenance pole, a main supporting element by which said detachable clamping connection means are carried, a socket element carried by said supporting element and arranged for engagement by the end of a line maintenance pole, and means provided for selectively and rigidly securing said socket element in different angular positions relative to said supporting element.

19. Line tapping apparatus comprising in combination, an elongated channel-shaped member of electrically conductive material adapted to be placed over an electric line wire and having means for clamping engagement with a line wire, said member having a portion of substantially rectangular cross-section, a line tapping device including a body portion having a substantially rectangular recess open at one side for entry of said member thereinto, a latching element pivotally supported by said body portion and having a substantially rectangularly recessed portion arranged to engage said rectangular portion of said member to retain said member in said first mentioned recess, and yieldable means operative to press said member into firm electrically conductive engagement with a wall of said first mentioned recess.

20. In apparatus for making tap-off connections to electric line wires, a channel shaped conducting element of wear and corrosion resisting metal, said element being adapted to be placed on an electric line wire with the open side of the element facing downwardly, a U-bolt carried by said element with the legs of the bolt extending down on opposite sides of the element, clamping nuts threaded respectively on the legs of the U-bolt, and a clamping bar having one end slidably and swivelly mounted on one of said legs and arranged to be swung about said one leg, said bar having adjacent its other end an open ended slot arranged to be swung into engagement with the other of said legs and having also a grooved seat for engagement with a line wire in said channel shaped element, said clamping nuts being operable to draw said element and said bar together to securely clamp a line wire between said element and said grooved seat.

BENJAMIN R. HERMANN.